United States Patent Office 3,051,894
Patented Aug. 28, 1962

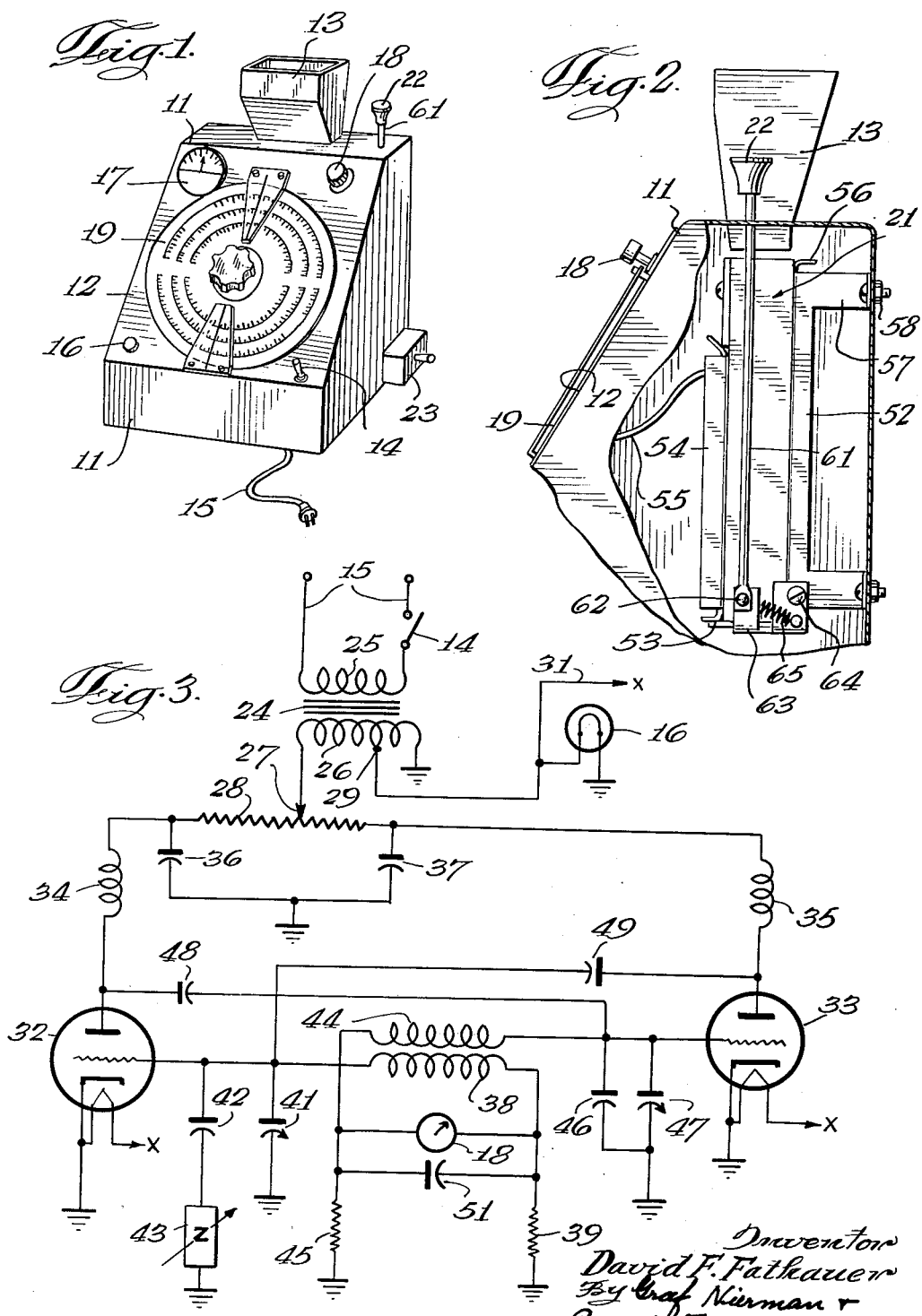

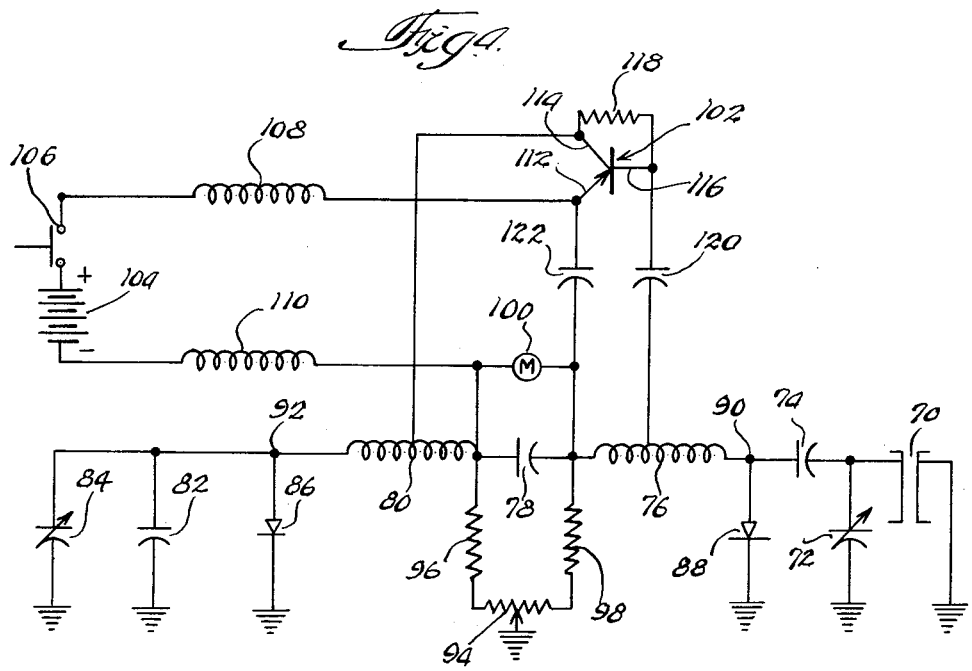

3,051,894
IMPEDANCE INDICATING INSTRUMENT
David F. Fathauer, Dalton City, Ill., assignor to Radson Engineering Corporation, Macon, Ill., a corporation of Illinois
Filed Oct. 2, 1958, Ser. No. 765,714
17 Claims. (Cl. 324—61)

The present invention relates to impedance indicating instruments, and more particularly to such instruments as applied to moisture testers. This application is a continuation-in-part of my copending application S.N. 603,534, filed August 13, 1956 (now abandoned).

Heretofore moisture testers have been employed for determining the moisture content of grain, fibers, and other materials. This information may be important in determining the value of the raw material or its adaptability for a particular use.

In general, such instruments are comparatively bulky and require careful adjustment. In some devices, the relationship of the testing instrument to ground or other instrumentalities adversely affects the accuracy of the measurements. In others, aging or deterioration of a component will produce an unbalance in the instrument and thus an erroneous reading.

In some cases, inaccuracies occur because of variable conditions of the material tested, and the wide range of measurements which the instrument must accommodate. Since most of the instruments of this type thus far available have been large and expensive, it further would be desirable to provide a small, simple and economical device which might be employed by one having a minimum of skill or technical knowledge.

The instant invention relies upon a unique method for determining a variable capacitance, and upon an inherent characteristic of the materials to be tested. That inherent characteristic is the relationship of the dielectric constant of the material to the moisture content thereof.

It is therefore one object of the instant invention to provide an improved circuit for the determination of an unknown reactance.

It is another object to provide an improved impedance responsive tester for moisture testing of a substance such as grains, fibers, and similar materials.

Another object of the invention is to provide an improved indicating circuit which eliminates the effect of stray capacitances therein.

Another object is to provide an improved indicating circuit which balances out the effects of variations in production due to the tolerances of the components employed.

Still another object is to provide an improved indicating circuit operable directly from any known current source irrespective of line voltage variations.

A further object is to provide an A.-C. powered indicating circuit wherein an impedance change produces a direct current proportional thereto.

Another object is to provide a completely portable unit using extremely small amounts of D.-C. electrical energy.

A further object is to provide an improved indicating or measuring circuit which indicates changes in impedance or dielectric constant.

Still another object is to provide an improved balanced measuring or indicating circuit responsive to an impedance change.

A still further object is to provide an improved moisture tester which is simple, accurate and light in weight.

These and other objects of the invention subsequently will become apparent by reference to the following description taken in conjunction with the accompanying drawings and claims.

In one form of the invention a tuned circuit is made up of a known inductance, a variable capacitance, and a cell having spaced metal plates to receive grain, which constitutes an unknown capacitance. The precise relationship between the value of this unknown capacitance and the moisture content of various grains placed in the cell is determined and a dial associated with the variable capacitance is calibrated directly in percentage of moisture content.

More particularly, the inductance, variable capacitance and unknown capacitance are connected in series and the capacitances are shunted by unilaterally conductive means whereby the capacitances accumulate electric charges directly related to their magnitude. By providing means for dissipating these charges and either measuring their relative magnitudes or making them equal by adjusting the calibrated variable capacitance, a direct indication of the magnitude of the unknown capacitance, and consequently a direct indication of the moisture in the dielectric thereof is obtained.

FIGURE 1 is a perspective view of a moisture tester embodying the present invention;

FIGURE 2 is a partially broken away end view showing the variable impedance element or grain cell;

FIGURE 3 is an electric circuit diagram of the present invention utilizing A.C. power; and FIGURE 4 illustrates an alternate embodiment of the invention utilizing a transistor circuit and D.C. power.

FIGURE 1 shows a moisture tester embodying the present invention and employing an A.C. circuit, the tester having a cabinet 11 provided with a sloping panel 12 and a hopper 13 at the top of the cabinet. On the sloping panel 12 there is located a power switch 14 to turn the power on and off as supplied through a suitable cord 15. When the power has been turned on and the device is ready for operation, a signal light 16 is illuminated. At the upper left corner there is a zero center direct current meter 17 which is used for initial balancing of the device and is also used for subsequently rebalancing the instrument in order to obtain a relative indication of the moisture content of grain or other material. For the initial balancing of the device there is provided at the upper right hand corner a knob 18 which, as subsequently will be explained, is connected to a vernier capacitor. Another capacitor is connected to the main instrument dial 19 which carries a plurality of indicia thereon which can be translated into or which might indicate directly the percentage of moisture in various grains and other materials.

The hopper 13, as may be seen from FIGURES 1 and 2, is located immediately above an impedance element or grain cell 21. A predetermined quantity of grain or other material is poured into the hopper 13, whereupon it falls into the cell 21. When measurements have been completed to determine the moisture content of the material in the cell 21, a push button 22 extending above the top of the cabinet 11 is actuated to open a trap door or bottom member of the cell 21, whereupon the material falls into a drawer 23 from which the material may be removed from the instrument. A further detailed explanation of the operation of the device will be given after reference has been made to the circuit diagram of FIGURE 3.

As shown in FIGURE 3, the power supply cord 15 is connected through the switch 14 to a transformer 24 having a primary winding 25 and a secondary winding 26. One end of the secondary winding is connected to a circuit ground, and the other end is connected to an adjustable contact 27 of a potentiometer or voltage divider 28. A tap 29 on the transformer is connected to a conductor 31 which is connected to the filaments of the vacuum tubes at arrowhead X and to the signal light 16.

The potentiometer 28 supplies alternating current power to the anodes of a pair of vacuum tubes 32 and 33 connected in a balanced oscillating indicating and measuring circuit. The anodes of the vacuum tubes 32 and 33 are connected through choke coils 34 and 35 to opposite ends of the potentiometer 28. The ends of the potentiometer 28 are connected through bypass capacitors 36 and 37 to ground. The choke coils 34 and 35 and the bypass condensers 36 and 37 prevent the transmission of spurious high frequency signals back through the transformer 24 to the line 15.

The grid to cathode circuits of vacuum tubes 32 and 33 form a part of a tuned or frequency determining circuit. The grid of the tube 32 is connected through an inductor 38 and a resistor 39 to ground. The grid of the vacuum tube 32 is further directly connected to ground through a relatively large variable capacitor 41 and through a coupling capacitor 42 and a variable impedance element 43. The variable capacitor 41 is controlled by dial 19 of FIGURE 1. The variable impedance element 43 comprises the grain cell 21 of FIGURE 2.

The grid of the vacuum tube 33 is connected through an inductor 44 and a series resistor 45 to ground. The grid of the vacuum tube 33 is also connected through a fixed capacitor 46 and a parallel variable capacitor 47 to ground. The small variable capacitor 47 is the vernier capacitor controlled by knob 18, as already described above with respect to FIGURE 1. The two inductors 38 and 44 are closely coupled together and actually constitute a single inductance. The inductance is split into two sections so that the meter may be inserted therebetween whereby a desirable balance with respect to ground is maintained. In one embodiment, the inductance comprises two coaxial windings of wire .010 diameter spaced from the adjacent wire by .010 inch clearance. The coil form supporting these two windings has a diameter of three-quarters of an inch, and fifty turns of wire constituted each inductor. Thus, it will be appreciated that very close coupling was obtained between the inductors 38 and 44. A feed back connection employing a capacitor 48 interconnects the anode of the vacuum tube 32 with the grid circuit of the vacuum tube 33, and a similar capacitor 49 provides a feed back connection between the anode of the vacuum tube 33 and the grid circuit of the vacuum tube 32. A direct current zero center meter 18 is connected in series with the inductors 44 and 38. A very large bypass capacitor 51 is connected across the meter 18. Thus the variable impedance device 43 of FIGURE 3 is the effective capacitance of the grain cell 21 of FIGURE 2. This comprises a rectangular box having two narrow side members 52 (only one of which is visible in FIGURE 2) of insulating material and a pivoted insulated bottom member 53. A vertical front panel 54 of metal is connected by a conductor 55 to the isolation capacitor 42 of FIGURE 3. Another parallel metal back panel 56 is located at the opposite edges of the insulating members 52 and has turned over end portions formed into legs 57 so that it may be secured by suitable bolts 58 to the rear of the cabinet 11 which is at ground potential and constitutes the circuit ground. The push button 22 is connected to a rod 61 pivoted at 62 to a bracket 63 forming a portion of the supporting hinge pivoted at 64 for the tiltable bottom member 53. A spring 65 secured to the insulating side panel 52 holds the bottom 53 in normal closed relation to the rest of the cell. When a predetermined quantity of grain is poured into the chute 13 to enter into the cell 21, the grain comprises the dielectric material between the parallel panels 54 and 56 which constitute a capacitor. A variation in the moisture content will produce a different dielectric constant between the capacitor plates 54 and 56 thereby comprising a variable or unknown impedance 43.

The movable contact 27 of the potentiometer 28 of FIGURE 3 is a screw driver adjustment which balances the operation of the vacuum tubes 32 and 33, which in one embodiment are contained in a single envelope and designated a 12AV7 vacuum tube. If it is ever necessary to replace this vacuum tube, or in the event of deterioration of any of the parts, it may be necessary to change the screw driver adjustment 27.

The balanced oscillator circuit shown in FIGURE 3, operating at about 2½ megacycles, provides balanced circuit operation when the capacitor 41 is rotated to a predetermined position by the dial 19 which is provided with calibrations and an associated pointer. For each material which is deposited in the hopper a separate set of calibrations is provided on dial 19 and one position of the dial represents the balanced condition when the cell is empty and air is the dielectric. Thus, before any grain or material is poured into the hopper 13, the capacitor 41 is moved to the predetermined "calibrate" position. If the meter 18 does not then register zero, the vernier capacitor 47 associated with the vacuum tube 33 and coupled by the knob 18 is adjusted to bring the meter 17 to zero. Thereafter grain or other material to be tested is placed into the hopper 13. Instructions with the device determine the exact quantity of each kind of material to be introduced into the hopper 13 for measurement within the limits of the calibrations on the dial 19. When the material has thus been introduced into the cell 21, the zero center meter 17 will show an unbalance whereupon the dial 19 is rotated to adjust the capacitor 41 to again return the meter 17 to the zero center position.

In one particular embodiment of the invention, the components of the circuit illustrated in FIG. 3 have the following values:

| | |
|---|---|
| 28, potentiometer | 10,000 ohms. |
| 32, 33, ½ of 12AV7. | |
| 34, 35, choke coil | 250 microhenries. |
| 36, 37, capacitor | .01 microfarad. |
| 38, 44, inductor | 50 turns on ¾ inch form. |
| 39, 45, resistor | 22,000 ohms. |
| 41, capacitor | 20–45 micro-microfarads. |
| 42, capacitor | .01 microfarad. |
| 46, capacitor | 50 micro-microfarads. |
| 47, capacitor | 2–15 micro-microfarads. |
| 48, 49, capacitor | 82 micro-microfarads. |
| 51, capacitor | .01 microfarad. |
| 18, 0.5–0–0.5 ma. meter | 1000 ohms. |

The operation of the circuit of FIG. 3 will now be described. The power supply for the oscillating circuit is an A.C. supply, and thus in a typical system, 60-cycle A.C. power will appear at the anodes of triodes 32 and 33. Therefore the oscillatory circuit of FIG. 3 will be operative only during the positive half cycles of applied power and will remain substantially quiescent during the negative half cycles. As the applied power is 60 cycle energy and the circuit is intended to oscillate at approximately 2.5 megacycles when the components listed above are employed, relatively long periods of steady-state 2.5 megacycle operation are provided. Therefore, the description which follows will assume steady-state operation of the 2.5 megacycle oscillator with a positive applied voltage at the anodes of triodes 32 and 33. As already described, transformer 24 provides the necessary filament and anode voltages, potentiometer 28 provides balanced loads for triodes 32 and 33, and capacitors 36 and 37 and chokes 34 and 35 prevent the feedback of high frequency energy into the line 15.

When the system is energized and a positive voltage is applied to the anodes it is also applied to the opposed grids through capacitors 48 and 49. As is conventionally understood, the circuit begins to oscillate due to inherent unbalance of the system. One grid is driven progressively more negative while the other becomes more positive. For example, if triode 33 is conducting an increasing current, the grid of triode 32 is becoming more negative whereby triode 32 approaches cut-off. This applies a positive signal to the grid of tube 33, further increasing conduction.

The tank circuit associated with the grids of the two tubes provides predetermined oscillatory operation, and the frequency of oscillation is determined by the values of the various components. In this particular embodiment the parallel combination of capacitors 41, 42 and 43 is in series with the parallel combination of capacitors 46 and 47 and these are in series circuit with closely coupled inductances 38 and 44. Also forming a part of the closed loop of the tank circuit is the parallel combination of meter 18 and capacitor 51.

The grid-cathode circuit of triode 32 is effectively in parallel with the network comprising capacitors 41, 42 and 43. Thus in the event that the grid of tube 32 becomes positive the tube will pass grid current which will effectively by-pass the capacitor network. Similarly, the grid-cathode circuit of triode 33 is in parallel with the network comprising capacitors 46 and 47, and thus if this grid becomes positive grid current will flow and the capacitors will be effectively shunted. Thus in addition to the basic bilateral tank circuit described above, two auxiliary unilateral circuits are provided. Whenever the grid of tube 32 becomes positive with respect to the cathode, current will flow from grid to cathode, charging capacitors 46 and 47 through inductance 44, large capacitor 51 and inductance 38. Conversely, when the grid of triode 33 becomes positive with respect to the cathode, the network comprising capacitors 41, 42 and 43 becomes charged through the inductances 38 and 44 and the capacitor 51.

The only discharge paths for the charges which may accumulate on the capacitor networks are through resistances 39 and 45. Thus when a D.C. charge accumulates on capacitors 46 and 47 current flow occurs in resistor 45, and when capacitors 41, 42 and 43 become charged, current flows in resistor 39. As these resistors are relatively large, having a resistance of 22,000 ohms, they do not form significant elements in the A.C. circuits already described but are important only in that they provide means for sensing the relative charges on the condenser networks and provide a discharge path for the networks.

The A.C. voltage generated in the oscillating circuit is substantially sinusoidal and regular. Therefore the current flow in the two unilateral circuits set forth above will depend upon the magnitude of the various impedances in the circuits. As the capacitor networks are the only circuit elements not common to both unilateral circuits, the charges thereon will be directly related to their magnitude. Therefore the magnitudes of the two capacitor networks determine the rate of current flow in resistors 39 and 45, and this comparative current flow in turn determines the voltage which appears across meter 18 and capacitor 51. Therefore the current in meter 18 is a direct indication of the magnitudes of the capacitors. If the system is initially balanced so that the meter 18 reads zero, changes in the unknown capacitance 43 will be indicated by current flow through meter 18. The meter could be calibrated to read the capacitance of capacitor 43 directly. However, for greatest simplicity and accuracy the capacitor 41 is variable and of approximately the same value as the unknown capacitor 43. Thus by manipulating capacitor 41 a balance is obtained where meter 18 again reads zero current.

The adjustment of capacitor 41 is a direct indication of the magnitude of capacitor 43, and in the described embodiment a calibrated dial 19 illustrated in FIG. 1 is secured to the shaft of capacitor 41 and indicates the percentage of moisture content in the grain deposited in cell 21, the cell and grain comprising the unknown capacitor 43. If the network comprising capacitors 41, 42 and 43 has a total capacitance equal to that of the network comprising capacitors 46 and 47 they will be charged at the same rate when the grids of tubes 32 and 33 become alternately positive. Thus the voltages appearing across resistors 39 and 44 will be equal and the meter 18 will indicate a difference voltage of zero.

If the grain in cell 21 is extremely dry, the network including capacitor 43 will have a lower capacitance and thus will be charged at a more rapid rate. Therefore the voltage appearing across resistor 39 will be greater than that across resistor 45, and this will be indicated on meter 18 and compensated for by manipulation of capacitor 41.

A second embodiment of the invention is illustrated in FIG. 4. This embodiment employs the same basic principle already fully described above with respect to FIG. 3. A single closed loop comprising several inductances and capacitance networks forms the essential component of a self-exciting oscillatory circuit in which a transistor is employed as the amplifying element for the feedback signal.

The tank circuit in FIG. 4 includes unknown capacitor 70 and variable capacitor 72 connected in parallel and in series with blocking capacitor 74, coil 76, by-pass capacitor 78, coil 80, and the parallel combination of capacitor 82 and vernier capacitor 84. A diode 86 such as a germanium diode is connected in parallel with capacitors 82 and 84, and an identical diode 88 is connected in parallel with the network including capacitors 70, 72 and 74.

The elements set forth above comprise a closed loop forming a tank circuit of relatively high "Q." As already described with respect to FIG. 3, on alternate half cycles a forward voltage will appear across the diodes and a small current will pass through diode 86 or diode 88. When point 92 becomes positive current flows in diode 86 and charges capacitors 70, 72 and 74 so that the point 90 will become somewhat negative with respect to ground. Conversely, on the next successive half cycle diode 88 will pass a small current which will in turn charge capacitors 82 and 84, whereby the point 92 will become somewhat negative with respect to ground.

Thus with diodes 86 and 88 effectively connected back to back through the circuit ground, the capacitors will become charged; the amount of the charge being directly related to the magnitude of the capacitive networks. These charges are dissipated through resistive networks comprising potentiometer 94 and resistors 96 and 98. The meter 100 is connected in parallel with the resistive network and will indicate the relative charges appearing on the capacitor network comprising capacitances 70, 72 and 74 and on the capacitor network comprising capacitors 82 and 84. These charges will in turn be directly dependent upon the magnitude of the various capacitors.

A discharge path for capacitors 82 and 84 is defined through the left-hand side of potentiometer 94, resistor 96 and inductance 80. Similarly a discharge path for capacitors 70, 72 and 74 is defined through the right-hand side of potentiometer 94, resistor 98 and inductor 76. If the impedances of the two capacitor networks are the same the charging of these networks will also be the same, the discharge through the resistance networks will be the same, and the meter 100 will indicate zero.

A unique method for energizing the tank circuit described above is provided in the embodiment shown in FIG. 4. A PNP type transistor 102 is connected in a common emitter configuration and is energized from a battery source 104. The battery source is connected to the circuit through a normally open push button switch 106 and two RF choke coils 108 and 110. The positive terminal of the battery 104 is connected to the emitter 112 of transistor 102 through choke 108. The negative terminal of battery 104 is connected to the collector 114 of transistor 102 through choke coil 110 and a portion of inductance coil 80.

The base 116 of transistor 102 is connected to the collector 114 through biasing resistor 118. The biasing resistor 118 is so selected that current will flow from battery 104 through switch 106, choke 108, emitter 112, base 116, bias resistor 118, inductance 80, and choke 110; the current being sufficient to provide the proper forward current bias. The collector voltage is applied to a portion of inductance 80, producing a corresponding positive feedback voltage in inductance 76. The positive signal induced in inductance 76 is applied between base 116 and emitter 112 through blocking condensers 120 and 122, respectively. It has been found that this circuit oscillates with stability and reliability, even though the circuit is effectively floating on the tank circuit and is not stabilized with respect to ground or any fixture.

The specific components employed in one specific embodiment of the circuit of FIG. 4 are as follows:

| | |
|---|---|
| 84, capacitor | 2–15 μμf. |
| 82, capacitor | 39 μμf. |
| 86 and 88, germanium diode | IN–90. |
| 96 and 98, resistors | 47,000 ohms. |
| 94, potentiometer | 100,000 ohms. |
| 76 and 80, inductor | 50 turns on ¾" form appropriately tapped. |
| 74, 78, 122, capacitor | .01 μf. |
| 72, capacitor | 20–45 μμf. |
| 100, meter | 100–0–100 ma. 950 ohms. |
| 120, capacitor | 470 μμf. |
| 108–110, choke | 750 μμh. |
| 104, battery | 6-volt. |
| 118, resistor | 33,000 ohms. |
| 102, transistor | 2N412. |

While two particular embodiments of the invention have been described employing vacuum tube and transistor type self-exciting oscillatory circuits, it will be apparent that various modifications can be made while still maintaining the essential features of the invention. For example, other oscillatory sources might be applied to the closed tank circuit, and either dry rectifiers or the grid-cathode circuit of triodes might be employed to provide the unilateral current necessary for determining the impedance magnitudes of the capacitance networks which are being compared. Also external sources of power may be employed as illustrated in FIGS. 1–3, or an internal battery supply may be utilized. When an internal supply is utilized the device will appear very much like that illustrated in FIG. 1. However, the line cord 15 is omitted, the toggle switch 14 becomes a push button switch, and the pilot light 16 is omitted when an internal energy source is available.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Apparatus energized from a source of electrical energy for measuring a variable capacitance comprising a self-exciting oscillatory circuit, said circuit including a tuned circuit adapted to receive oscillatory electrical energy, said tuned circuit comprising a predetermined inductance, a relatively large capacitance, a known capacitance, and said variable capacitance connected seriatim and forming a single relatively low impedance closed loop for oscillatory energy, unilaterally conductive means connected in parallel with said known capacitance and conductive principally in only one direction, unilaterally conductive means connected in parallel with said variable capacitance and conductive principally in only the other direction, and indicator means responsive to direct current connected in parallel with said relatively large capacitance.

2. Apparatus energized from a source of electrical energy for measuring a variable capacitance comprising a self-exciting oscillatory circuit, said circuit including a tuned circuit adapted to receive oscillatory electrical energy, said tuned circuit comprising a predetermined inductance, a relatively large capacitance, a known capacitance and said variable capacitance connected seriatim and forming a single relatively low impedance closed loop for oscillatory energy, unilaterally conductive means connected in parallel with said known capacitance and conductive principally in only one direction, unilaterally conductive means connected in parallel with said variable capacitance and conductive principally in only the other direction, indicator means responsive to direct current connected in parallel with said relatively large capacitance, and resistance means connected to each terminal of said large capacitance and a common terminal of said unilaterally conductive means.

3. A balanced indicating circuit comprising a pair of vacuum tubes connected to a source of anode potential, said vacuum tubes each having a grid to cathode circuit including an inductor and a relatively large series resistor connected in parallel with a capacitor, said grid to cathode circuits being connected in opposed series relationship, said inductors being closely coupled together, feedback connections between the anode of each tube and the grid of the other tube, and a low impedance meter means connected between the junctures of said inductors and said resistors to form a single oscillatory circuit.

4. A balanced indicating circuit comprising a pair of vacuum tubes, a source of alternating potential connected to the cathodes and the anodes of said tubes, said vacuum tubes each having a grid to cathode circuit including an inductor and a relatively large series resistor connected in parallel with a capacitor, said grid to cathode circuits being connected in opposed series relationship, said inductors being closely coupled together, feedback connections between the anode of each tube and the grid of the other tube, and a low impedance meter means connected between the junctures of said inductors and said resistors to form a single oscillatory circuit.

5. A balanced indicating circuit comprising a pair of vacuum tubes connected to a source of alternating potential between the anodes and the cathodes thereof, said vacuum tubes each having a grid to cathode circuit including an inductor and a relatively large series resistor connected in parallel with a capacitor, said grid to cathode circuits being connected in opposed series relationship, said inductors being closely coupled together, feedback connections between the anode of each tube and the grid of the other tube, and a low impedance D.C. meter shunted by a capacitor connected between the junctures of said inductors and said resistors to form a single oscillatory circuit.

6. A device for testing the moisture in a substance comprising a balanced vacuum tube circuit including a pair of triode tubes, each anode being connected through a choke coil to one end of a potentiometer, each end of said potentiometer being connected through a capacitor to ground, a source of A.C. connected between ground and the movable contact of said potentiometer, a feedback circuit for each tube including a capacitor connected between the anode of one tube and the grid of the other tube, a grid to cathode circuit for each tube comprising an inductor in series with a relatively large resistor, said inductors being closely coupled together, capacitive means connected in parallel with each grid to cathode circuit, one of said tubes having a grid to cathode circuit including a fixed capacitor in series with a capacitance container for receiving the substance to be tested, a low impedance meter connected between said grid circuits at the junctures between said inductors and said resistors, and an indicating dial connected to one of said capacitors calibrated to provide an indication of the relative moisture content of the substance tested, said capacitance means, said meter, and said inductance being connected in a single closed oscillatory circuit.

7. Apparatus energized from a source of electrical energy for measuring an unknown capacitance within a known range comprising a self-exciting oscillatory circut, said circuit including transistor means having at least an emitter connection, a collector connection and a base connection connected to said source of electrical energy, a tuned circuit comprising a predetermined inductance, a relatively large capacitance, a known capacitance, and capacitance means including said unknown capacitance connected seriatim, unilaterally conductive means connected in parallel with said capacitance means and conductive principally in only one direction, unilaterally conductive means connected in parallel with said known capacitance and conductive principally in only the other direction, relatively high impedance means shunting said unilaterally conductive means, and indicator means responsive to direct current connected in parallel with said relatively large capacitance, said collector, emitter and base connections being connected to said tuned circuit whereby the voltage across a portion of said inductance is applied between said emitter and base connections, and said collector connection applies an additive voltage in said tuned circuit.

8. Apparatus energized from a source of electrical energy for measuring an unknown capacitance comprising a self-exciting oscillatory circuit, said circuit including transistor means having at least an emitter connection, a collector connection and a base connection, a tuned circuit operatively connected to said collector connection and energized by the signal output of said collector connection, means connecting said base and emitter connections to said tuned circuit whereby the signal applied to said base and emitter connections from said tuned circuit are amplified in said transistor and augment said signal output, said tuned circuit comprising a predetermined inductive reactance, a known capacitance and said unknown capacitance connected in circuit to define a closed loop, unilaterally conductive means in parallel with said unknown capacitance conductive principally in only one direction in said loop, unilaterally conductive means in parallel with said known capacitance conductive principally in only the other direction in said loop, relatively high impedance means shunting said unilaterally conductive means, and means operatively connected to said tuned circuit and sensing the direction of net direct current in said loop which is a direct indication of the relative magnitudes of said unknown capacitance and said known capacitance.

9. Apparatus for measuring an unknown capacitance comprising a self-exciting oscillatory circuit, said circut including transistor means having at least an emitter connection, a collector connection and a base connection, a tuned circuit operatively connected to said collector connection and energized by the signal output of said collector connection, means connecting said base and emitter connections to said tuned circuit whereby the signal applied to said base and emitter connections from said tuned circuit are amplified in said transistor and augment said signal output, a source of voltage connected between said emitter and a point on said tuned circuit electrically spaced from said collector connection, said tuned circuit comprising a predetermined inductive reactance, a known capaictance and said unknown capacitance connected in circuit to define a closed loop, unilaterally conductive means in parallel with said unknown capacitance conductive principally in only one direction in said loop, unilaterally conductive means in parallel with said known capacitance conductive principally in only the other direction in said loop, relatively high impedance means shunting said unilaterally conductive means, and means operatively connected to said tuned circuit and sensing the direction of net direct current in said loop which is a direct indication of the relative magnitudes of said unknown capacitance and said known capacitance.

10. Apparatus for measuring an unknown capacitance comprising a self-exciting oscillatory circuit, said circuit including transistor means having at least an emitter connection, a collector connection and a base connection, a tuned circuit operatively connected to said collector connection and energized by the signal output of said collector connection, means connecting said base and emitter connections to said tuned circuit whereby the signal applied to said base and emitter connections from said tuned circuit are amplified in said transistor and augment said signal output, a source of voltage connected between said emitter and a point on said tuned circuit electrically spaced from said collector connection, a self-biasing resistance connected between said base connection and said collector connection, said tuned circuit comprising a predetermined inductive reactance, a known capacitance and said unknown capacitance connected in circuit to define a closed loop, unilaterally conductive means in parallel with said unknown capacitance conductive principally in only one direction in said loop, unilaterally conductive means in parallel with said known capacitance conductive principally in only the other direction in said loop, relatively high impedance means shunting said unilaterally conductive means, and means operatively connected to said tuned circuit and sensing the direction of net direct current in said loop which is a direct indication of the relative magnitudes of said unknown capacitance and said known capacitance.

11. Apparatus for measuring an unknown capacitance comprising a self-exciting oscillatory circuit, said circuit including transistor means having at least an emitter connection, a collector connection and a base connection, a tuned circuit operatively connected to said collector connection and energized by the signal output of said collector connection, means connecting said base and emitter connections to said tuned circuit whereby the signal applied to said base and emitter connections from said tuned circuit are amplified in said transistor and augment said signal output, a source of voltage connected between said emitter and a point on said tuned circuit electrically spaced from said collector connection, a self-biasing resistance connected between said base connection and said collector connection, a normally open push button switch connected in series with said source of voltage, said tuned circuit comprising a predetermined inductive reactance, a known capacitance and said unknown capacitance connected in circuit to define a closed loop, unilaterally conductive means in parallel with said unknown capacitance conductive principally in only one direction in said loop, unilaterally conductive means in parallel with said known capacitance conductive principally in only the other direction in said loop, relatively high impedance means shunting said unilaterally conductive means, and means operatively connected to said tuned circuit and sensing the direction of net direct current in said loop which is a direct indication of the relative magnitudes of said unknown capacitance and said known capacitance.

12. Apparatus for measuring an unknown capacitance comprising a self-exciting oscillatory circuit, said circuit including transistor means having at least an emitter connection, a collector connection and a base connection, a tuned circuit operatively connected to said collector connection and energized by the signal output of said collector connection, means connecting said base and emitter connections to said tuned circuit whereby the signal applied to said base and emitter connections from said tuned circuit are amplified in said transistor and augment said signal output, a source of voltage connected between said emitter and a point on said tuned circuit electrically spaced from said collector connection, a self-biasing resistance connected between said base connection and said collector connection, a normally open push button switch connected in series with said source of voltage, said tuned circuit comprising a predetermined inductance, a relatively large capacitance, a known capacitance, and said unknown capacitance connected seriatim, unilaterally conductive means connected in parallel with said unknown capacitance and conductive principally in only one direction, unilaterally conductive means connected in parallel with said known capacitance and conductive principally in only the other direction, relatively high impedance means shunting said unilaterally conductive means, and indicator means responsive to direct current connected in parallel with said relatively large capacitance.

13. Apparatus energized from a source of electrical energy for measuring an unknown capacitance within a known range comprising a self-exciting oscillatory circuit, said circuit including transistor means having at least an emitter connection, a collector connection and a base connection connected to said source of electrical energy, a tuned circuit comprising a predetermined inductance, a relatively large capacitance, a known capacitance, and said unknown capacitance connected seriatim, unilaterally conductive means connected in parallel with said unknown capacitance and conductive principally in only one direction, unilaterally conductive means connected in parallel with said known capacitance and conductive principally in only the other direction, high resistance means electrically interconnecting a common terminal of said unknown capacitance and said known capacitance and the two terminals of said large capacitance, and indicator means responsive to direct current connected in parallel with said relatively large capacitance, said collector, emitter and base connections being connected to said tuned circuit whereby the voltage across a portion of said inductance is applied between said emitter and base connections, and said collector connection applies an additive voltage in said tuned circuit.

14. Apparatus energized from a source of electrical energy for measuring an unknown capacitance comprising a self-exciting oscillatory circuit, said circuit including transistor means having at least an emitter connection, a collector connection and a base connection connected to said source of electrical energy, a tuned circuit comprising two inductances of predetermined impedances coupled closely magnetically, a known capacitance, and said unknown capacitance connected seriatim to form a closed loop, unilaterally conductive means connected in parallel with said unknown capacitance and conductive principally in only one direction in said loop, unilaterally conductive means connected in parallel with said known capacitance and conductive principally in only the other direction in said loop, and direct current indicating means electrically connected in series between said inductances, said collector, emitter and base connections being connected to said tuned circuit whereby the voltage across a portion of one of said inductances is applied between said emitter and base connections, and said collector connection applies an additive voltage to the other of said inductances.

15. Apparatus energized from a source of electrical energy for measuring the moisture content of grain by measuring its dielectric constant, said apparatus comprising a self-exciting oscillatory circuit, said circuit including transistor means having at least an emitter connection, a collector connection and a base connection connected to said source of electrical energy, means for receiving a measured quantity of such grain including two spaced conductive plates, which cooperate with grain disposed therebetween to define an unknown capacitance within a known range, a tuned circuit comprising a predetermined inductance, known capacitance means, and capacitance means including said unknown capacitance connected seriatim to form a closed loop, unilaterally conductive means connected in parallel with said unknown capacitance and conductive principally in only one direction in said loop, unilaterally conductive means connected in parallel with said known capacitance and conductive principally in only the other direction, and indicator means responsive to the direction of average current in said tuned circuit whereby said capacitance means may be set to produce an indication of zero average current and thereby indicate the magnitude of said unknown capacitance, said collector, emitter and base connections being connected to said tuned circuit whereby the voltage across a portion of said inductance is applied between said emitter and base connection, and said collector connection applies an additive voltage to said tuned circuit.

16. Apparatus for measuring an unknown capacitance having a capacitance value within a known range comprising; an oscillatory circuit comprising a predetermined inductance, a known capacitance, and capacitance means including said unknown capacitance connected seriatim to form a single closed loop for circulating a single signal of oscillatory energy, means for circulating a periodic electrical signal in said oscillatory circuit, and means for varying the capacitance in said oscillatory circuit over said known range whereby the capacitance of said capacitance means may be made substantially equal to said known capacitance, first unilaterally conductive means connected in parallel with said capacitance means and conductive principally in only one direction in said loop, and second unilaterally conductive means connected in parallel with said known capacitance and conductive principally in only the other direction in said loop; first resistance means shunting said capacitance means; second resistance means shunting said known capacitance; and means for determining the difference in D.C. voltages appearing across said resistances.

17. Apparatus for measuring an unknown reactance having a value within a known range comprising a single oscillatory circuit including a predetermined inductance, a known capacitance, and capacitive reactance means including said unknown reactance connected seriatim to form a single closed loop for circulating a single signal of oscillatory energy, means for circulating a periodic electric signal in said oscillatory circuit, and means for varying the reactance of said oscillatory circuit whereby the capacitance of said capacitive reactance means may be made substantially equal to said known capacitance, first unilaterally conductive means connected in parallel with said capacitive reactance means and conductive principally in only one direction in said loop, and second unilaterally conductive means connected in parallel with said known capacitance and conductive principally in only the other direction in said loop; first resistance means shunting said capacitive reactance means; second resistance means shunting said known capacitance; and means for determining the difference in D.C. potential voltage appearing across said resistances.

References Cited in the file of this patent

UNITED STATES PATENTS

| | | |
|---|---|---|
| 2,052,413 | Lord | Aug. 25, 1936 |
| 2,395,425 | Osborne | Feb. 26, 1946 |
| 2,487,523 | Coake | Nov. 8, 1949 |
| 2,766,428 | Sippoch | Oct. 9, 1956 |